United States Patent
Lambertus et al.

(10) Patent No.: US 9,340,267 B2
(45) Date of Patent: May 17, 2016

(54) METHOD FOR DETECTING NAVAL MINES AND NAVAL MINE DETECTION SYSTEM

(71) Applicant: ATLAS ELEKTRONIK GmbH, Bremen (DE)

(72) Inventors: Detlef Lambertus, Osterholz-Scharmbeck (DE); Ralf Richter, Oyten (DE)

(73) Assignee: ATLAS ELEKTRONIK GmbH, Bremen (DE)

( * ) Notice: Subject to any disclaimer, the term of this patent is extended or adjusted under 35 U.S.C. 154(b) by 0 days.

(21) Appl. No.: 14/387,656

(22) PCT Filed: Feb. 13, 2013

(86) PCT No.: PCT/DE2013/100052
§ 371 (c)(1),
(2) Date: Sep. 24, 2014

(87) PCT Pub. No.: WO2013/143527
PCT Pub. Date: Oct. 3, 2013

(65) Prior Publication Data
US 2015/0049588 A1    Feb. 19, 2015

(30) Foreign Application Priority Data
Mar. 30, 2012    (DE) .......................... 10 2012 006 566

(51) Int. Cl.
*G01S 15/00*    (2006.01)
*B63G 7/00*    (2006.01)
*B63G 8/00*    (2006.01)
*G01S 15/04*    (2006.01)
*G05D 1/02*    (2006.01)

(52) U.S. Cl.
CPC *B63G 7/00* (2013.01); *B63G 8/001* (2013.01); *G01S 15/04* (2013.01); *G05D 1/0206* (2013.01); *B63G 2007/005* (2013.01)

(58) Field of Classification Search
None
See application file for complete search history.

(56) References Cited

U.S. PATENT DOCUMENTS

| 4,975,888 | A |   | 12/1990 | Kern |   |
|---|---|---|---|---|---|
| 5,844,159 | A | * | 12/1998 | Posseme | B63G 7/02 114/21.1 |
| 6,220,168 | B1 | * | 4/2001 | Woodall | B63B 22/003 102/411 |

(Continued)

FOREIGN PATENT DOCUMENTS

| DE | 10 2006 045686 | 2/2008 |
|---|---|---|
| JP | S 57-196309 | 12/1982 |
| WO | WO 03/045776 | 6/2003 |

*Primary Examiner* — Travis Hunnings
(74) *Attorney, Agent, or Firm* — Pearl Cohen Zedek Latzer Baratz LLP

(57) ABSTRACT

The invention concerns a group of vessels (24), having an unmanned surface vessel (3) and an unmanned underwater vessel (1, 1a), wherein the underwater vessel comprises a location device, in particular a sonar device, for sensing location data (12) in the underwater area and one evaluation unit or more evaluation units, and the evaluation unit or the evaluation units are arranged in such a manner that these comprise detection means (20) for detecting (14) a contact (MILEC) with the aid of the sensed location data (12) and with classification means (21) for classifying (15) the detected contact (MILEC) as a mine-like contact (MILCO) or non mine-like contact (NONMILCO), whereby classification is accomplished by comparing the contact (MILEC) with known mine information so that a mine-like contact (MILCO) can be identified as a mine contact (MINE) or as another object (NOMBO).

8 Claims, 3 Drawing Sheets

(56) References Cited

U.S. PATENT DOCUMENTS

| | | | | |
|---|---|---|---|---|
| 6,370,085 B1* | 4/2002 | Finkle | ............... | G01S 3/801 367/130 |
| 6,738,314 B1* | 5/2004 | Teeter | ............... | B63G 7/02 367/131 |
| 6,754,390 B2* | 6/2004 | Dobeck | ............... | G01S 7/539 382/228 |
| 8,807,002 B2* | 8/2014 | Lambertus | ............... | B63G 7/02 102/402 |
| 9,016,185 B1* | 4/2015 | Lambertus | ............... | B63G 7/02 89/1.13 |
| 2002/0110279 A1* | 8/2002 | Dobeck | ............... | G01S 7/539 382/228 |
| 2008/0127876 A1* | 6/2008 | Scourzic | ............... | B63G 7/02 114/316 |
| 2012/0053914 A1* | 3/2012 | Barr | ............... | G01S 7/539 703/2 |
| 2012/0059829 A1* | 3/2012 | Barr | ............... | G06K 9/6268 707/748 |
| 2013/0239869 A1* | 9/2013 | Hesse | ............... | B63G 7/02 114/330 |
| 2015/0225050 A1* | 8/2015 | Lambertus | ............... | B63G 7/02 89/1.13 |

* cited by examiner

METHOD FOR DETECTING NAVAL MINES AND NAVAL MINE DETECTION SYSTEM

CROSS-REFERENCE TO RELATED APPLICATIONS

This application is a National Phase Application of PCT International Application No. PCT/DE2013/100052, entitled "METHOD FOR DETECTING NAVAL MINES AND NAVAL MINE DETECTION SYSTEM", International Filing Date Feb. 13, 2013, published on Oct. 3, 2013 as International Publication No. WO/2013/143527, which in turn claims priority from German Patent Application No. 10 2012 006 566.3, filed Mar. 30, 2012, all of which are incorporated herein by reference in their entirety.

FIELD OF THE INVENTION

The invention concerns a group of vessels having an unmanned surface vessel, an unmanned underwater vessel, and a sea mine detection system comprising the group of vessels, as well as an aircraft.

BACKGROUND

Sea mines are explosive charges used in water against vessels and submarines. Sea mines are regularly utilized for blocking an area of sea. To protect seagoing vessels or convoys of seagoing vessels from the dangers of mines, mine-free routes are created in order to steer the vessels through a mine-free route. When hunting for mines, individual mines are located and later deactivated or detonated deliberately.

As is known, sea mines are located with the help of sonar devices. The sonar device is normally installed on board a mine-hunting vessel traveling on the surface, whereby location data in the underwater area are recorded and evaluated. Detection of a contact is followed by classification of the detected contact as a mine-like contact or a non-mine-like contact.

If a mine-like contact is detected, the next step is to identify the mine, for which conventional mine-identifying divers or remote-controlled underwater drones are deployed.

If the identification reveals that the sonar device has, in fact, recorded the location data of a sea mine, the next step in the procedure is to deactivate or detonate the mine or else to steer the seagoing vessels to be protected from the sea mines around the mine identified.

Thereby, as is known, underwater vessels, specially equipped for this mission with an explosive charge for destroying sea mines, are deployed.

The creation or detection of a mine-free passage through a mined area of sea using the means known is a very time-consuming process, since all sea mines have to be detected and identified by deploying several vessels. As the detection of location data is necessary for mine-hunting and the mine-hunting vessel, with its hull-mounted sonar device, must travel at least close to the mined area of sea or travel directly into the minefield, this additionally poses a considerable risk to the manned support platform. In order to protect the manned vessel, the speed of the convoy of vessels to be protected must also be reduced.

SUMMARY

The underlying problem of the present invention is to create a device for detecting sea mines which ensures the effective and reliable detection of sea mines with a reduction of risk to manned vessels.

This problem is solved by a group of vessels comprised of an unmanned surface vessel and an unmanned underwater vessel, wherein the underwater vessel comprises a location device, particularly a sonar device, for detecting location data in an underwater area, and an evaluation unit or several evaluation units, and that the evaluation unit or the evaluation units is/are set up in such a manner that these comprise a means of detection, for detecting a contact (MILEC) based on the location data sensed, as well as a means of classification, for classifying the detected contact (MILEC) as a mine-like contact (MILCO) or a non-mine-like contact (NONMILCO), whereby the classification is accomplished by comparing the contact (MILEC) with known mine information so that a mine-like contact (MILCO) can be identified as a mine contact (MINE) or as another object (NOMBO).

Thus, a group of vessels can be made available that can autonomously clear an area of sea, specifically an underwater area.

In particular, mines can be detected and classified, and thus identified. As well, in particular, the operation of the group of vessels can proceed autonomously, so that, for example, mines autonomously detected by the group of vessels can be detonated or deactivated.

The autonomous underwater vessel can collect location data and can detect contacts, as well as classify the contacts detected. The autonomous underwater vessel is provided for this purpose in particular, which has the means of recording location data in the underwater area, as well as the means for detection and the means for classifying the contacts detected. In this way, the detection of contacts and the classification of detected contacts can take place at a great distance from manned vessels, by means of an autonomously controlled mission of the autonomous underwater vessel.

Consequently, manned seagoing vessels can travel at a significant distance from a mined area of sea and hence travel through the area of sea with enhanced protection. Due to the distance of the manned seagoing vessels from the area of operation of the group of vessels, the group of vessels is provided enough time to destroy or deactivate the sea mines detected, even if the succeeding manned vessels are traveling at great speed.

Moreover, by means of the submersible autonomous underwater vessel, location data can be also be sensed at great depths, at which, under certain circumstances, data sensing may not be reliable in the case of a hull-mounted location system or the recording may be at a lower resolution. Sensing location data can therefore lead to a more reliable detection of sea mines in the underwater area, and to the detection of bottom mines.

A sonar device (Sound Navigation and Ranging) is used as a means of recording location data, wherein, depending on the application, horizontally or vertically disposed devices or a combination of horizontally and vertically disposed devices are provided. Here, the term sonar is understood to mean, in particular, devices which locate objects in the underwater area by means of acoustic sensors and underwater sounds. The underwater vessel may have a great number of localization sensors, which may be connected. For example, a side-scan sonar device may be connected to a bow sonar device and/or an under-hull sonar device.

Location data are evaluated during the detection of contacts. A contact with an underwater object can be determined through contour detection and/or shadow processing based on the location data or can be classified as such. If several sonar devices or sonar systems are connected together, especially horizontal and vertical or additional sonar sensors, the location data of the individual sonar devices can be combined and used for the process of detecting contacts.

Location data and/or additional sensor data, e.g. camera images from an underwater camera, can be evaluated during the course of the classification.

The means for detecting contacts and the means for classification comprise one or more evaluation units developed for evaluating the location data. Such an evaluation unit may be associated with the sonar system and/or may be implemented in the control unit of the underwater vessel. For example, if a contact is detected in the location data by means of contour detection and/or shadow processing, the contact detected can be classified and/or identified as a mine-like contact or as a non-mine-like contact, for example with complementary camera images. During the classification and identification steps, the contact detected, in particular, is compared to known mine information, which may be provided by an appropriate mine database.

If a mine-like contact is classified in the evaluation of the location data, the contact can be identified in a subsequent or parallel step. In order to determine whether a sea mine or another object is present, a mine can be identified clearly or a mine contact can be excluded by means of mapping or correlating image information or sonar information with the mine database information. An exclusion, in particular, can be made by detecting specific non-mine objects, such as bicycles, whereby even non-mine objects can be stored in the mine database.

In one embodiment, the autonomous underwater vessel is connected to the unmanned surface vessel by the transmission of signals, with the connection being established by means of a fiber-optic cable.

Real-time transmission can thus be made available. Due to the physical connection, the underwater vessel can be located in the event of a malfunction and, if required, brought on board a vessel.

To enhance the resolution and quality of the means of location, the means of location may comprise several sonar apparatuses or sonar systems. The identification rate (percentage) can be increased by combining data. The higher the identification rate, the more reliable is the detection of an object as a mine or a specific mine.

In another embodiment, the surface vessel has a drive and a control device, which are set up in such a way that the surface vessel is steered with regard to the underwater vessel. With this arrangement, the underwater vessel can be the "master" and the surface vessel the "slave". The surface vessel can therefore respond quickly and adequately to underwater situations.

For quick clearance of mines in an area of sea, the surface vessel may carry drones equipped with explosive charges for destroying sea mines as and when required. Here, the drones may be controlled and steered by the surface vessel and/or by the underwater vessel. Controlling and steering by the underwater vessel has the special advantage that the drone can be steered by means of the location data provided by the underwater vessel.

In another embodiment, the group of vessels has additional underwater vessels. This again helps faster clearance of the area of sea. Two, three, four, five, or more underwater vessels can be deployed.

A further aspect of the invention solves the task by means of a sea mine detection system comprised of a group of vessels as described above and a support platform, whereby the sea mine detection system is equipped in such a way that the support platform and the surface vessel are connected for data exchange, with the connection being, in particular, a radio connection by which communication takes place. The support platform can also be connected to the surface vessel or the underwater vessel via a fiber-optic cable. This enables extremely fast data exchange.

In a related embodiment, the sea mine detection system has several groups of vessels, each having a surface vessel and at least one autonomous underwater vessel. A passable passage through a mined area of sea can thus be created quickly as several groups of vessels can be disposed in succession along the passage to be traversed and, in this way, can autonomously clear an area of sea.

In a preferred embodiment of the invention, the same underwater vessel, featuring a device for recording location data, a detection device and a classification device, performs the identification. During a patrol for recording location data, the autonomous underwater vessel can quickly approach a contact classified as a mine-like contact and perform the identification, for example by means of a camera. This allows quick and effective detection of sea mines at a safe distance from manned sea vessels, i.e. detection and classification of contacts and subsequent or parallel identification.

Detection and classification as a mine-like contact and subsequent or parallel identification can be carried out independently by the autonomous underwater vessel as part of the mission program.

In yet another embodiment, the mine-like contacts classified are communicated by the underwater vessel to a manned control station via a communication device. An operator can then decide if the autonomous underwater vessel should leave its navigation area after a mission program and approach the location of the classified contact for the purpose of identification.

After identification as a sea mine, the sea mine can be destroyed or deactivated, or a mine-free passage can be determined by the appropriate evaluation of the locations of other sea mines already detected, whereby the detected sea mines are bypassed.

The autonomous underwater vessel preferably communicates with a manned support platform and conveys information about the detection of sea mines. Communication takes place, in particular, via the surface vessel, which acts as a relay between the underwater vessel and the support platform.

In an embodiment in which the autonomous underwater vessel initially only undertakes recording of location data and classification of mine-like contacts, at least the information about the classified contacts is conveyed to the support platform, whereby the identification of the contacts classified can then be initiated by the support platform. In the process, the underwater vessel receives appropriate instructions from the support platform for approaching and identifying the contact, or another underwater vessel is dispatched to identificy the contact as a sea mine and approaches the location of the contact classified.

In another embodiment, contacts already classified are identified by the same autonomous underwater vessel, as part of the mission program. The operation of the autonomous underwater vessel can be monitored via the signal-transmission connection to the support platform, whereby, if required, the sea mine detection system or the group of vessels can be engaged by the operator via the connection.

Information can be transmitted wirelessly from the autonomous underwater vessel or, in a preferred embodiment, via a fiber-optic cable. Efficient information transfer takes place via the fiber-optic cable, whereby measured values recorded by the autonomous underwater vessel are transferred through the underwater area to the support platform in real time. For example, apart from the location data, additional information, obtained from the location data by classification of contacts or by identification, camera images or other mission information, can also be transferred.

Transmission of visual images during the identification step is particularly advantageous since control of the sensitive maneuvers for approaching a sea mine can be assumed by an operator via real-time transmission of the surroundings of the underwater vessel.

In an advantageous embodiment, a sea mine detection system comprises, in addition to one or several underwater vessels, a surface vessel that communicates with the support platform via radio communication. Information transmission, i.e. in real time, and receipt of control commands in the opposite direction, is possible, even where an autonomous underwater vessel is operating at a great distance from the support platform, if the underwater vessel is accompanied by an unmanned surface vessel. The surface vessel transmits information as an intermediary between the underwater vessel and the support platform.

The surface vessel may be connected to the autonomous underwater vessel via a fiber-optic cable and to the support platform via a radio link. Advantageously, the surface vessel has an engine and a control unit, which steers the surface vessel while taking the behavior of the underwater vessel into account. For example, during the patrol by the underwater vessel, the surface vessel advantageously trails the underwater vessel in such a way as to avoid undesired tensile load on the fiber-optic cable.

The surface vessel and the underwater vessel form a group of vessels that autonomously detects sea mines in an assigned area of sea. Advantageously, several underwater vessels are assigned to a surface vessel; these are connected to the surface vessel via a fiber-optic cable. A preferred embodiment provides, for example, two underwater vessels. These operate on each side of the surface vessel, which is located between the underwater vessels, and serve to clear a wider passage.

The vessels of the group of vessels are carried by a seagoing vessel or an aircraft and are deployed in a mine-endangered area of sea as required. The vessels are preferably carried on the same seagoing vessel which is equipped for communication with the surface vessel or with the surface vessels of the sea mine detection system or with the groups of vessels on which enables monitoring of the mission by means of an operator via the signal-transmitting connection via radio communication and a fiber-optic cable.

In another specific embodiment, the sea mine detection system comprises several groups of vessels, each with a surface vessel and underwater vessels assigned to the surface vessel, whereby each group of vessels is assigned to a specific area of sea. In this way, groups of vessels can patrol areas of sea assigned to them and at the same time detect sea mines. The mine-endangered area of sea to be patrolled, for example a planned passage, can be divided among individual groups of vessels, and, consequently, the detection of all sea mines can be significantly expedited in the area of sea to be cleared. Using this method, the convoy to be protected can be steered through the area of sea or the mine-free passage at a significantly higher speed (than the clearing speed of the underwater vessels).

The groups of vessels can be deployed in a line along the course of the following seagoing vessel or the convoys in the area of sea. The groups of vessels are redeployed in succession in the new area of sea at the head of the fleet, whereby vessels of each group of vessels are transferred to this new area of sea. If a group of vessels accomplishes its mission in the area of sea assigned to it, these vessels are redeployed at the head of the line of the vessel groups. Due to the ongoing redeployment (rolling) of the groups of vessels, the sea mine detection system can quickly clear a passage in a mine-endangered area of sea.

In one embodiment, in order to redeploy the groups of vessels, the underwater vessels of the relevant groups of vessels are picked up by the surface vessel and transported to the head of the line with the high speed of the surface vessel, to detect sea mines in a new area of sea. In another embodiment, the underwater vessels or the entire group of vessels are/is picked up by a rapid means of transport, for example a helicopter, and transported to the head of the line, in the new area of sea assigned to this group of vessels.

The speed of detecting sea mines in the course of a seagoing vessel increases in proportion to the number of groups of vessels which are deployed in a line over the course of the vessel or convoy. Even at lower speed of the underwater vessels over the course of the convoy to be protected, which can be reduced still further by deploying underwater vessels for identification, an area of sea can be cleared quickly through the combined deployment of several groups of vessels in a line. Consequently, an increase in the speed of the following seagoing vessels or the convoy traveling over the mine-free passage is possible, in proportion to the number of groups of vessels of the sea mine detection system.

In yet another embodiment, the surface vessel carries unmanned underwater vessels in the form of drones equipped with explosive charges, in particular, disposable or reusable drones, which are activated after the classification or identification of sea mines. The drones equipped with explosive charges are brought along during the sea mine detection system's mission, and, on accomplishing a mission in a given area of sea, are transported to the new area of sea at the head of the line of several groups of vessels, preferably together with the surface vessel.

In addition, a method of detecting sea mines can be provided, whereby location data are recorded and evaluated in the underwater area, whereby after detecting a contact (MILEC), the detected contact is classified as a mine-like contact (MILCO) or non-mine-like contact (NONMILCO), and, after classification of a mine-like contact (MILCO), an underwater vessel approaches the location of the mine-like contact and identifies it as a mine contact (MINE) or as another object (NOMBO), whereby an autonomous underwater vessel records location data and detects as well as subsequently classifies the contacts detected (MILEC).

In a refinement of the invention, the same underwater vessel may perform classification and subsequent identification.

In order to provide location data, location data (12) [sic—see drawings] are recorded by means of a sonar apparatus.

In a further embodiment, the autonomous underwater vessel communicates with a manned support platform.

In a related refinement of the invention, the autonomous underwater vessel is accompanied by an unmanned surface vessel which communicates with the support platform via a radio link and transmits information as an intermediary between the autonomous underwater vessel and the support platform.

In addition, the autonomous underwater vessel may move ahead of a manned seagoing vessel or a convoy.

In another refinement of the method, several autonomous underwater vessels, each with an associated surface vessel, can be simultaneously deployed in individual groups of vessels, whereby each group of vessels is assigned to a specific area of sea.

In order to clear an area as quickly as possible, the groups of vessels can be deployed in a line along the course of the seagoing vessel or convoy following in the areas of sea and can be transported one after the other to respective new areas of sea at the head of the line, whereby vessels of the given group of vessels are transferred to the new area of sea. This provides a rolling progression of clearance and elimination.

In one embodiment, on accomplishing their mission in an area of sea, the underwater vessels are picked up by the relevant surface vessels belonging to their group of vessels and are transported to respective new areas of sea.

Further, on accomplishing their mission in a previous area of sea, vessels of a group of vessels can be picked up by another means of transport and transported to a respective new area of sea.

BRIEF DESCRIPTION OF THE DRAWINGS

Other features will be apparent from the dependent Claims and the exemplary embodiments, which are explained in more detail in the following illustration:

DETAILED DESCRIPTION

Figure 1:
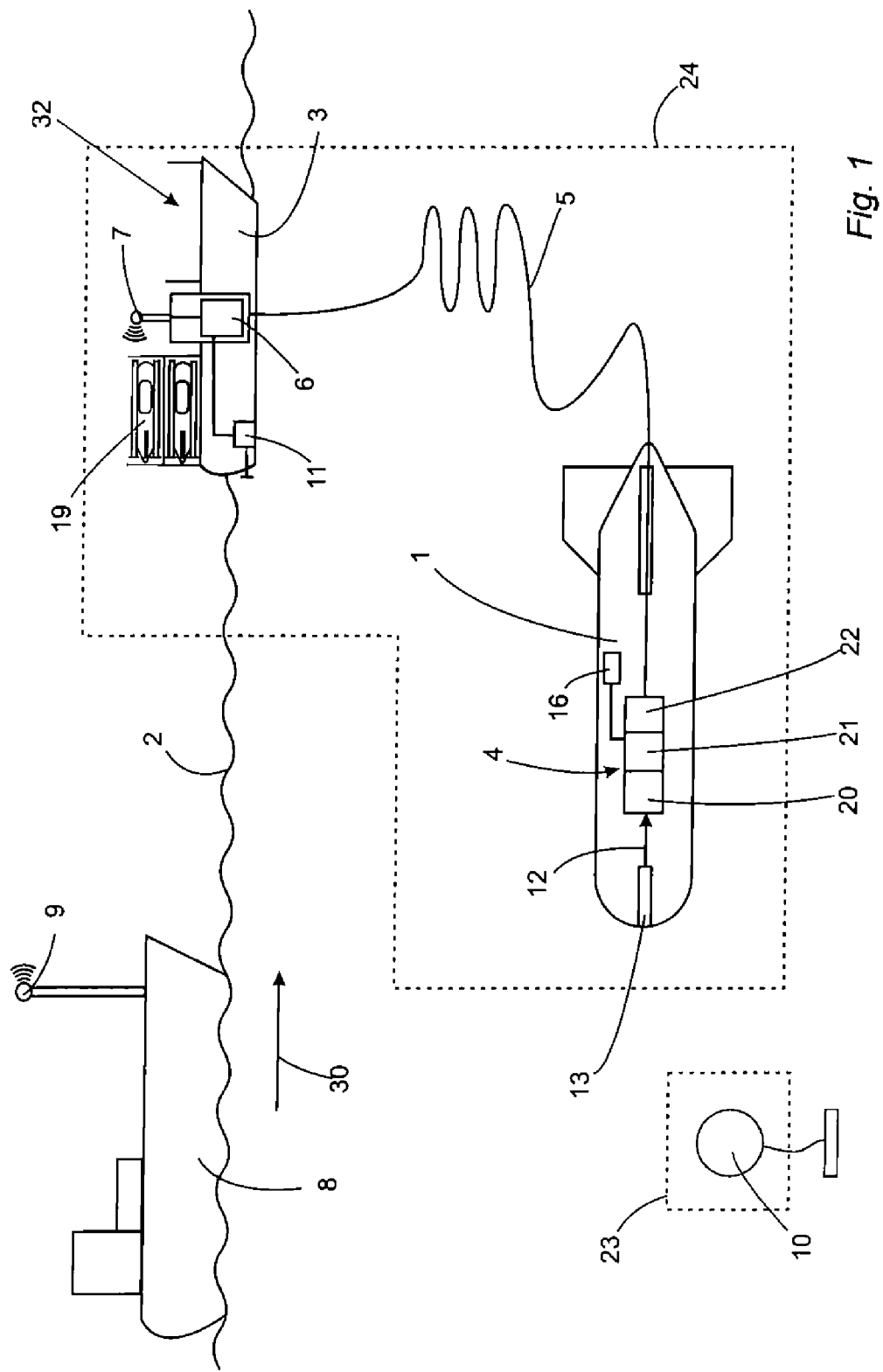
FIG. 1 depicts a schematic view of a sea mine detection system comprising a group of vessels.

FIG. 1 depicts a sea mine detection system with an autonomous underwater vessel (1) and an unmanned surface vessel (3) traveling on the water surface (2). The autonomous underwater vessel comprises a control unit (4), which navigates the underwater vessel, taking a pre-specified mission program into account. The autonomous underwater vessel (1) is connected to the surface vessel (3), specifically to a control unit (6) of the surface vessel (3), via a fiber-optic cable (5), accompanied by means of signal transmission.

The surface vessel (3) comprises a wireless antenna (7) that enables radio communication with a support platform. In the exemplary embodiment depicted, the support platform is a seagoing vessel (8) or a mine-hunting boat featuring a wireless antenna (9) and communicating with the surface vessel (3) via the wireless antenna (9). The surface vessel (3) facilitates the transfer of information between the autonomous underwater vessel (1) and the manned seagoing vessel (8).

A control station, in which an operator monitors the mission of the autonomous underwater vessels (1) and the surface vessels (3) based on the information conveyed by the surface vessel (3) and, where appropriate, intervenes in the autonomous control, is provided on board of the seagoing vessel (8).

The autonomous underwater vessel (1) moves ahead of the manned seagoing vessel (8) and performs the detection of sea mines (10), as explained in more detail below, in a mine-endangered area of sea. The autonomous underwater vessel operates with the support of the surface vessel (3), to enable ongoing information exchange between the underwater vessel (1) and the seagoing vessel (8).

The autonomous underwater vessel (1) and the surface vessel (3) form a so-called "group of vessels" (24) (see also FIG. 3), which moves ahead of the seagoing vessel (8) and which, by detecting sea mines (10), facilitates the navigation of the seagoing vessel (8) or a convoy of seagoing vessels (8) through a mine-free passage. In the process, the sea mines detected are either destroyed or deactivated, or the seagoing vessel (8) and the accompanying vessels are navigated past the sea mines detected (10).

The surface vessel (3) features an engine (11), which is controlled by the control unit (6) of the surface vessel. The surface vessel (3) is steered along the course of the seagoing vessel (8), through the assigned area of sea, whereby the autonomous underwater vessel (1) records location data in the underwater area in order to detect sea mines (10). The guidance of the surface vessel (3) and the underwater vessel (1) are interconnected within the group of vessels (24).

In an alternative exemplary embodiment, in navigating the surface vessel (3), the control unit (6) takes the navigation information of the autonomous underwater vessel (1) into account, which is transferred to the surface vessel (3) via the fiber-optic cable (5).

Navigation information comprises, for example, information concerning the course, the direction, depth of the water, the position (25) or other information on the current operating situation of the underwater vessel (1). By taking the navigation information of the autonomous underwater vessel (1) into account, the surface vessel (3) or the underwater vessel (1) is positioned so as to prevent a tensile load on the fiber-optic cable (5).

In order to detect sea mines (10), the autonomous underwater vessel (1) records location data (12), which are evaluated for detecting sea mines. Location data (12) are recorded by means of a sonar apparatus (13), which is to be understood as appropriate sonar devices and related equipment, in particular, sensors, by means of which objects are located in the underwater area with the help of sound pulses.

For the sake of simplicity, the drawing depicts only single sonar (13). However, the autonomous underwater vessel (1) may comprise side-scan sonar as well as bow sonar or bottom sonar arranged on the floor of the autonomous underwater vessel, or a combination of several such sonar units. If several sonar systems are provided, the location data of the sonar apparatuses (13) are combined and the combined location data (12) are evaluated.

Figure 2:
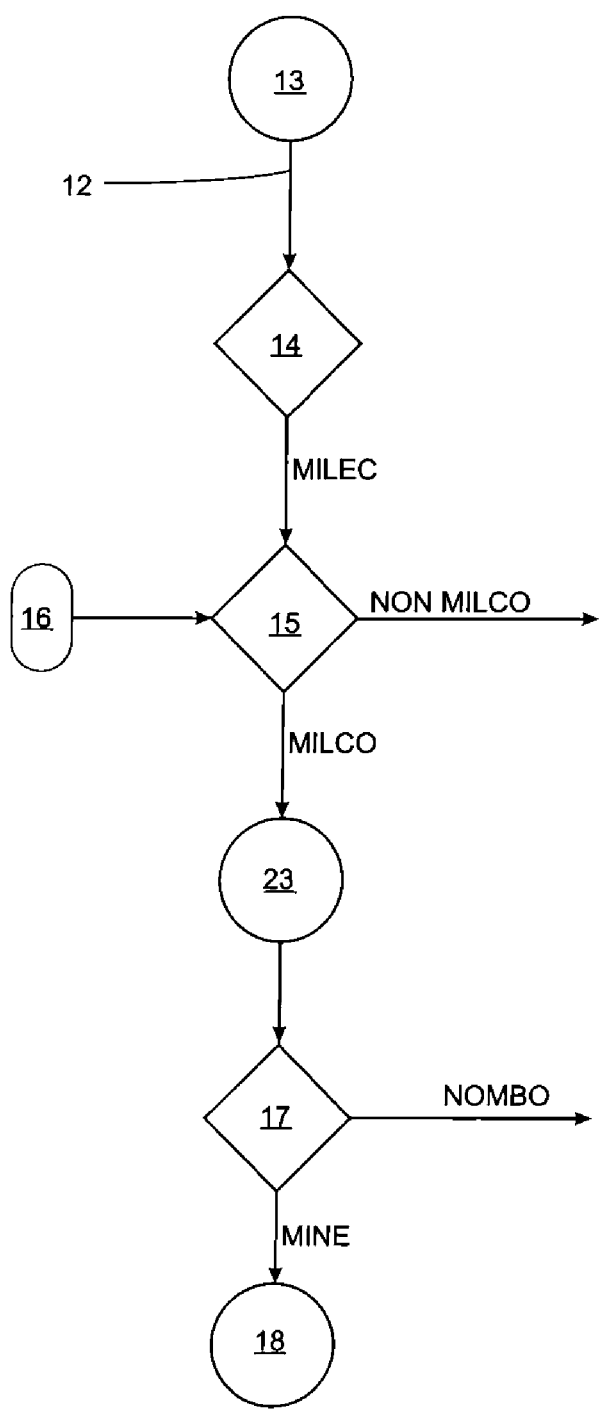
FIG. 2 depicts a flow chart of a method for detecting sea mines using a sea mine detection system according to FIG. 1.

As shown in FIG. 2, contacts (14) are detected on the basis of the continuously recorded location data (12). During detection (14), the existence of an object in the underwater area monitored is recognized through contour detection or shadow processing. Detection of a contact MILEC ("mine-like echo") is followed by classification (15) as MILCO ("mine-like contact") or NONMILCO (non mine-like contact). Accordingly, the location data (12) of the MILEC contact detected is evaluated based on the information from a mine database (16), whereby, where there is correspondence with or similarity to the relevant information from the mine database (16), a mine-like contact (MILCO) is assumed.

If comparison of the detected contact (MILEC) with the information from the mine database (16) reveals that this is not a mine-like contact (NONMILCO) and therefore an object other than a sea mine, no further action is taken.

If the classification (15) reveals a mine-like contact (MILCO), the mine-like contact MILCO is identified (17) as a mine contact (MINE) or other object (NOMBO) ("non-mine-like bottom object") in a further procedural step. Where the contact is identified as an object other than a sea mine, no further action is taken. If the identification (17) reveals a mine contact (MINE), i.e. the presence of a sea mine, the elimination of the identified sea mine is initiated on the basis of the results of the identification (17). In order to create a mine-free passage, the sea mine identified is preferably destroyed and, given an appropriate mine-hunting instruction (18), a disposable drone or a reusable drone (19) [sic—not shown], equipped with an explosive charge, is activated.

The group of vessels (24) (FIG. 1, FIG. 3) is a part of the sea mine detection system and at least detects (14) contacts and classifies (15) mine-like contacts, and, in addition, identifies (17) sea mines, as in the exemplary embodiment depicted. Furthermore, together with specific vessels of the sea mine detection system, drones (19) are also brought along in order to destroy reliably identified sea mines.

The drones (19) are preferably kept ready on board a surface vessel (3) (FIG. 1) for deployment as required. In the exemplary embodiment, every surface vessel (3) carries several such drones (19) during its mission; equipment with four drones (19) has proved to be particularly advantageous. The drones (19) are specifically remote-controlled or autonomous, unmanned underwater vessels, which are equipped with an explosive charge. The drone (19) approaches the location of the sea mine identified (10) and detonates this by means of the explosive charge.

For detecting (14) a MILEC contact and its subsequent classification (15), the autonomous underwater vessel (1) features an appropriate detection device (20) and a classification device (21). In the exemplary embodiment depicted, the detection device (20) and the classification device (21) are part of the control unit (4) of the autonomous underwater vessel (1) or are implemented in the control unit (4). In another exemplary embodiment, the detection device (20) and the classification device (21) are integrated in an evaluation unit, which may be assigned to the sonar apparatus (13).

The results of the detection (14) of contacts and the classification (15) of mine-like contacts, and, where required, the identification (17) of sea mines, are taken into account when navigating the underwater vessel. As part of its autonomous mission, the autonomous underwater vessel (1) can thus autonomously test the area of sea assigned to it for the presence of sea mines (10). Location data (12) are recorded far in advance of the manned seagoing vessel (8), so that classification (15) can be carried out regardless of the position of the seagoing vessel (8).

In the exemplary embodiment depicted, the autonomous underwater vessel (1) also has a means of identification, (22) with which the identification (17) as a mine contact (MINE) can be made after classification (15) of location data (12) as a mine-like contact (MILCO). After classification (15) of a mine-like contact (MILCO), the autonomous underwater vessel (1) approaches the location (23) of the mine-like contact (MILCO) and carries out the identification (17).

The autonomous underwater vessel (1) is thus used for detecting (14) and for classifying (15) contacts, as well as for identifying mine contacts (MINE). Use of the same underwater vessel for classifying (15) mine-like contacts (MILCO) and subsequent identification (17) of mine contacts (MINE) ensures quick and efficient detection of sea mines, since the autonomous underwater vessel (1) must only deviate marginally from its mission course to steer towards the location (23) of the contact to be identified and can thus reach the location (23) quickly.

The information from the evaluation of the location data (12), i.e. the results of the detection (14), the classification (15), and the identification (17), are transferred via the fiber-optic cable (5) and the radio link of the surface vessel (3) to the manned seagoing vessel (8) or to the control station provided there.

In an exemplary embodiment of the invention, the autonomous underwater vessel (1), as part of its mission program, automatically approaches the location (23) of the location data (12) classified by it as a mine-like contact (MILCO) and then carries out identification (17).

In a further exemplary embodiment, the autonomous underwater vessel (1) reports the existence of a mine-like contact (MILCO), determined in the course of the classification (15), to the manned control station on board the seagoing vessel (8), without initially having to deviate from its course. For subsequent identification (17), the autonomous underwater vessel (1) is given appropriate instructions by the operator of the sea mine detection system on board the seagoing vessel (8), to steer towards (5) the location (23) and to carry out identification (17).

Based on the information received from the autonomous underwater vessel (1), the operator on board the seagoing vessel issues instructions to the surface vessel (3) for a mine-hunting mission (18), whereupon the surface vessel (3) activates a drone (19) for destroying a sea mine (10). In yet another advantageous exemplary embodiment, the group of vessels autonomously decides on the further procedure after identifying (17) a sea mine, and activates a drone (19) for a mine-hunting mission (18).

Figure 3:
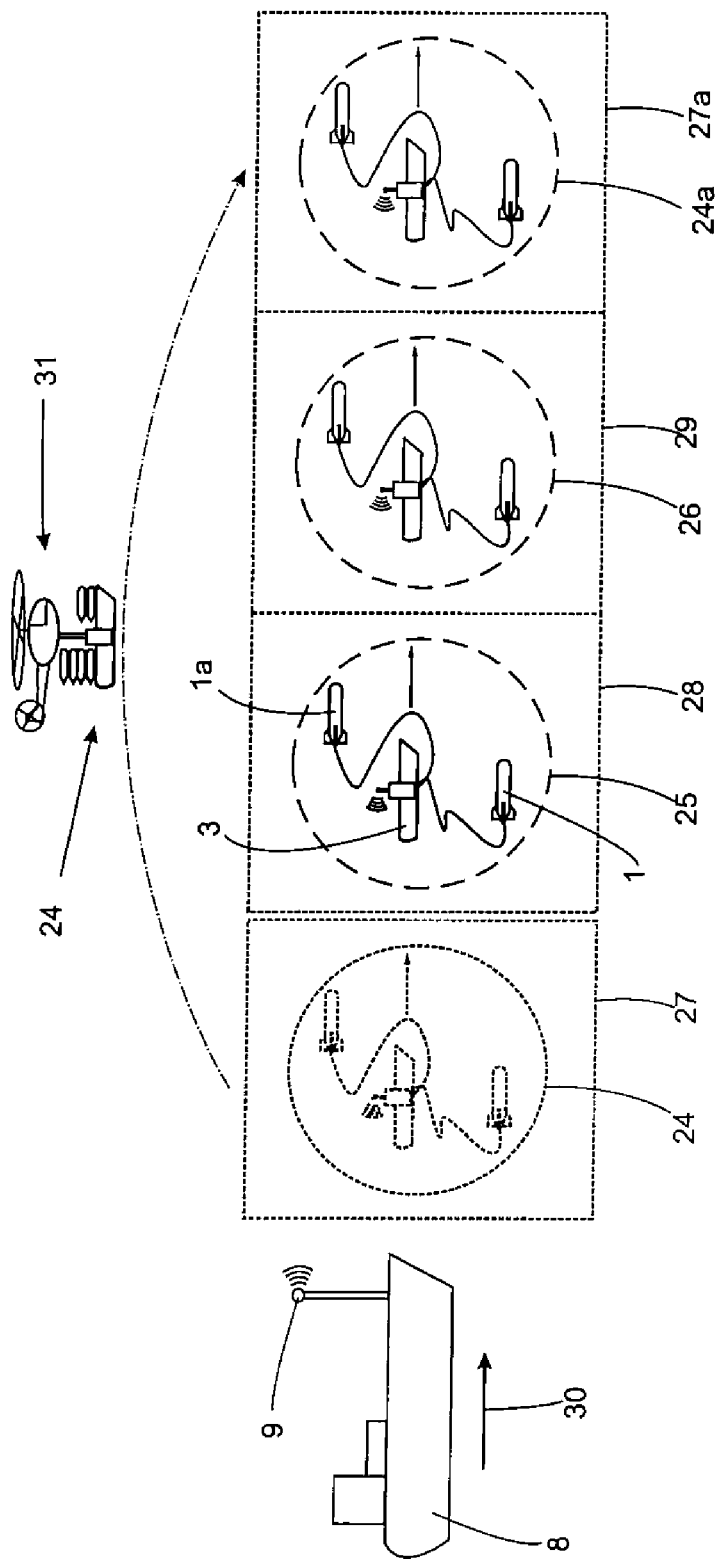
FIG. 3 depicts a schematic view of a sea mine detection system with several groups of vessels, each with a surface vessel and several autonomous underwater vessels.

FIG. 3 depicts an exemplary embodiment of a sea mine detection system with several groups of vessels (24, 25, 26), each with a surface vessel (3) and autonomous underwater vessels (1, 1a). As described in FIG. 1, the signal transmitting surface vessels (3) are connected to the underwater vessels (1, 1a) assigned to them and operate jointly in the sea mine detection system. Each group of vessels (24, 25, 26) is given a specific area of sea (27, 28, 29) in which to execute its mission program. The areas of sea (27, 28, 29) are located in a line along the course (30) of the seagoing vessel (8) or the convoy following. The groups of vessels (24, 25, 26) essentially follow the same course as the seagoing vessel (8) and patrol the area of sea (27, 28, 29) assigned to them. The surface vessel (3) crosses the area of sea (27, 28, 29) in as straight a line as possible along the course (30).

In the exemplary embodiment shown, each group of vessels (24, 25, 26) comprises a surface vessel (3) and two autonomous underwater vessels (1, 1a), i.e. two autonomous underwater vessels (1, 1a) are assigned to every surface vessel of the sea mine detection system.

The allocation of two autonomous underwater vessels (1, 1a) per group of vessels (24, 25, 26) enables faster clearance of a broad passage through a mined area of sea, whereby, the two autonomous underwater vessels (1, 1a) operate on both sides of the surface vessel (3). The pair of underwater vessels (1, 1a) is synchronized with respect to the navigation of the underwater vessels (1, 1a). For this purpose, the control unit (6) of the surface vessel (3) can convey specific control information to each of the underwater vessels connected via the fiber-optic cable (5).

In order to increase the clearance speed of the sea mine detection system and/or the width of a vessel passage to be cleared through a mined area of sea, more than two autonomous underwater vessels (1, 1a) may be provided in each of the groups of vessels (24, 25, 26) of the sea mine detection system and connected to the relevant surface vessels (3).

As soon as the underwater vessels (1, 1a) have accomplished their mission in the assigned area of sea (27, 28, 29), the associated group of vessels (24, 25, 26) is moved to the head of the line of the groups of vessels (24, 25, 26). Vessels of the relevant group of vessels (24, 25, 26) are moved to the new area of sea (27, 28, 29) in order to take up or continue the planned mission for detecting sea mines in the new location.

In order to ensure continuous clearance of the planned passage for the seagoing vessel or the convoy following, the group of vessels (24) which is closest to the seagoing vessel (8), which is represented by dashed lines in the representation, is re-deployed at the head of the line of vessels, in order to undertake detection of sea mines there as an additional group of vessels (24a) in the repeating line of groups of vessels.

In order to redeploy a group of vessels (24, 25, 26), vessels of a given group of vessels (24a) on accomplishing their mission in the previous area of sea (27) are picked up by a quick means of transport and are transported to the new area of sea (27a) at the head of the line. In the exemplary embodiment depicted, the means of transport for the groups of vessels is a helicopter (31).

The helicopter (31) picks up the surface vessel (3) with its freight of drones (19) and the two autonomous underwater vessels (1, 1a). Advantageously, in order to ensure quick and safe transport, the underwater vessels (1, 1a) are docked to the associated surface vessel (3) before being picked up by the helicopter (31). For this purpose, an appropriate receiving device (32) is installed on the surface vessel (3).

Alternately to the additional means of transport, for example the helicopter (31), the groups of vessels (24, 25, 26) can be transported to the new areas of sea by means of the propelled surface vessels (3). For this purpose, the surface vessels (3) have a powerful engine (11), which allows relatively higher speed for the transfer than the convoy speed with which the surface vessels (3) accompany the active underwater vessels (1, 1a) during the mission.

The number of groups of vessels (24, 25,26) deployed is selected in such a manner that the desired speed of the seagoing vessel (8) or the convoy is derived from the product of the number of vessels and the convoy speed. In other words, the clearance speed with which sea mine detection can be carried out in a passage can be increased in proportion to the number of groups of vessels deployed, so that the seagoing vessels (8) can travel quickly through the mine-endangered area of sea.

All features mentioned in the aforementioned description of the drawings, in the claims, and in the introductory part of the specification, can be used individually as well as in any combination. The disclosure of the invention is therefore not restricted to the combinations of features described or claimed. Rather, all combinations of features are to be regarded as having been disclosed.

The invention claimed is:

1. A group of vessels having an unmanned surface vessel and an unmanned autonomous underwater vessel, wherein the surface vessel has a drive and a control device, which is arranged in such a manner that the surface vessel is steered with regard to the autonomous underwater vessel taking the behavior of the autonomous underwater vessel into account, and the autonomous underwater vessel comprises a sonar device, for sensing location data in the underwater area and one or more evaluation units, the evaluation units arranged in such a manner so as to include a detection device for detecting a contact (MILEC) by the sensed location data, and a classification device for classifying the detected contact (MILEC) as a mine-like contact (MILCO) or a non-mine-like contact (NONMILCO), wherein the classification is accomplished by comparing the contact (MILEC) with known mine information so that a mine-like contact (MILCO) can be identified as a mine contact (MINE) or as another object (NOMBO) and an area of sea can be autonomously cleared.

2. A group of vessels in accordance with claim 1, wherein the autonomous underwater vessel is connected to the unmanned surface vessel by signal transmissions, wherein the connection is realized by an optical fiber cable.

3. A group of vessels in accordance with claim 1, wherein the sonar device comprises a plurality of sonar devices or sonar systems.

4. A group of vessels in accordance with claim 1, wherein the surface vessel carries drones equipped with explosive charges for destroying sea mines.

5. A group of vessels in accordance with claim 1, comprising a second group of underwater vessels.

6. A sea mine detection system comprising a group of vessels in accordance with claim 1 and a support platform, whereby the support platform and the surface vessel are connected for the purpose of data exchange.

7. A sea mine detection system in accordance with claim 6, comprising a plurality of groups of vessels, each with one surface vessel and at least one autonomous underwater vessel.

8. An aircraft comprising a group of vessels according to claim 1.

* * * * *